(12) United States Patent
Huang et al.

(10) Patent No.: US 12,284,135 B2
(45) Date of Patent: Apr. 22, 2025

(54) SELECTIVE SUB-BAND CHANNEL QUALITY INDICATOR REPORTING

(71) Applicant: QUALCOMM Incorporated, San Diego, CA (US)

(72) Inventors: Yi Huang, San Diego, CA (US); Ahmed Elshafie, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 629 days.

(21) Appl. No.: 17/649,519

(22) Filed: Jan. 31, 2022

(65) Prior Publication Data
US 2022/0329394 A1    Oct. 13, 2022

Related U.S. Application Data

(60) Provisional application No. 63/173,183, filed on Apr. 9, 2021.

(51) Int. Cl.
*H04L 5/00* (2006.01)
(52) U.S. Cl.
CPC .......... *H04L 5/0057* (2013.01); *H04L 5/0042* (2013.01)

(58) Field of Classification Search
CPC ........................... H04L 5/0052; H04L 5/0042
USPC .......................................................... 370/252
See application file for complete search history.

(56) References Cited

U.S. PATENT DOCUMENTS

| 2009/0168718 | A1* | 7/2009 | Wang | H04L 5/0057 370/329 |
| 2012/0082116 | A1* | 4/2012 | Kwon | H04B 17/26 370/328 |

\* cited by examiner

*Primary Examiner* — Christopher R Crompton
(74) *Attorney, Agent, or Firm* — Harrity & Harrity LLP

(57) ABSTRACT

A base station may transmit a set of CSI-RSs corresponding to a set of ports of a UE and the UE may perform a set of CQI measurements on each port and across each sub-band. The UE may select, for each CSI-RS resource that the UE measures, a set of M worst CQIs and may select a best CSI-RS resource based at least in part on a corresponding set of M worst CQIs for the CSI-RS resource. The UE may report the M worst CQIs for the selected CSI-RS resource. Alternatively, the UE may select, for each CSI-RS resource that the UE measures, a set of M worst CQIs and may select a worst CSI-RS resource. In this way, the UE enables the base station to select a DMRS port and/or an MCS to use for communication.

30 Claims, 11 Drawing Sheets

SELECTIVE SUB-BAND CHANNEL QUALITY INDICATOR REPORTING

CROSS-REFERENCE TO RELATED APPLICATION

This Patent Application claims priority to U.S. Provisional Patent Application No. 63/173,183, filed on Apr. 9, 2021, entitled "SELECTIVE SUB-BAND CHANNEL QUALITY INDICATOR REPORTING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for selective sub-band channel quality indicator reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

In some communications systems, reliability requirements may be imposed on communications between a user equipment (UE) and a base station (BS). For example, ultra-reliable low-latency communications (URLLC) may be deployed to support connected devices, Internet of Things (IoT) devices, autonomous driving deployments, and many other types of use cases. To satisfy the reliability requirements, a BS may request that a UE report only a subset of channel quality indicators (CQIs) when the UE performs a set of CQI measurements of a channel state information (CSI) reference signal (RS) (CSI-RS) across a set of sub-bands. In this case, the UE may report only CQIs of the worst M sub-bands among all sub-bands measured by the UE. In other words, the UE may report one or more CQIs with the lowest values among all CQIs that the UE has determined. By reporting the CQIs of the worst M sub-bands, the BS is enabled to select a modulation and coding scheme (MCS) based at least in part on a worst case with respect to channel quality (e.g., the BS selects the MCS based at least in part on the lowest CQI values that the UE has measured). In this way, the BS ensures that the MCS is selected to guarantee that the reliability requirement for URLLC is satisfied.

In multi-port operation, a BS may transmit a set of CSI-RSs corresponding to a set of ports of the UE and the UE may perform a set of CQI measurements on each port and across each sub-band. For example, the UE may perform a first set of CQI measurements of a first CSI-RS on a first port and for a set of sub-bands, and a second set of CQI measurements of a second CSI-RS on a second port and for the set of sub-bands. However, current reporting of CQI measurements is limited to single port operation. Thus, some aspects described herein provide techniques for CQI reporting when measuring a set of CSI-RSs across a set of sub-bands. For example, a UE may select, for each CSI-RS resource that the UE measures, a set of M worst CQIs and may select a best CSI-RS resource (e.g., based at least in part on a corresponding set of M worst CQIs for the CSI-RS resource). In this case, the UE may report the M worst CQIs for the selected CSI-RS resource. In this way, using a "worst-best" selection procedure, the UE enables the BS to pick a demodulation reference signal (DMRS) port on which to schedule URLLC traffic and an MCS for the URLLC traffic on the selected DMRS port. In another example, the UE may select, for each CSI-RS resource that the UE measures, a set of M worst CQIs and may select a worst CSI-RS resource. In this way, using a "worst-worst" selection procedure, the UE enables the BS to select an MCS based at least in part on a worst-case scenario of channel conditions across DMRS ports.

In some aspects, a UE for wireless communication includes a memory, and one or more processors, coupled to the memory, configured to: measure a plurality of sets of CQI measurements for a plurality of measurement resources, wherein each measurement resource, of the plurality of measurement resources, is associated with a set of CQI measurements, of the plurality of sets of CQI measurements, corresponding to a set of sub-bands; select one or more CQI measurements, of the plurality of sets of CQI measurements, based at least in part on a configured set of selection criteria; and report the one or more CQI measurements selected based at least in part on the configured set of selection criteria.

In some aspects, a method of wireless communication performed by a UE includes measuring a plurality of sets of CQI measurements for a plurality of measurement resources, wherein each measurement resource, of the plurality of measurement resources, is associated with a set of CQI measurements, of the plurality of sets of CQI measurements, corresponding to a set of sub-bands; selecting one or more CQI measurements, of the plurality of sets of CQI measurements, based at least in part on a configured set of selection criteria; and reporting the one or more CQI measurements selected based at least in part on the configured set of selection criteria.

In some aspects, a non-transitory computer-readable medium storing a set of instructions for wireless communication includes one or more instructions that, when executed by one or more processors of a UE, cause the UE to: measure a plurality of sets of CQI measurements for a plurality of measurement resources, wherein each measurement resource, of the plurality of measurement resources, is associated with a set of CQI measurements, of the plurality of sets of CQI measurements, corresponding to a set of sub-bands; select one or more CQI measurements, of the plurality of sets of CQI measurements, based at least in part on a configured set of selection criteria; and report the one or more CQI measurements selected based at least in part on the configured set of selection criteria.

In some aspects, an apparatus for wireless communication includes means for measuring a plurality of sets of CQI measurements for a plurality of measurement resources, wherein each measurement resource, of the plurality of measurement resources, is associated with a set of CQI measurements, of the plurality of sets of CQI measurements, corresponding to a set of sub-bands; means for selecting one or more CQI measurements, of the plurality of sets of CQI measurements, based at least in part on a configured set of selection criteria; and means for reporting the one or more CQI measurements selected based at least in part on the configured set of selection criteria.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
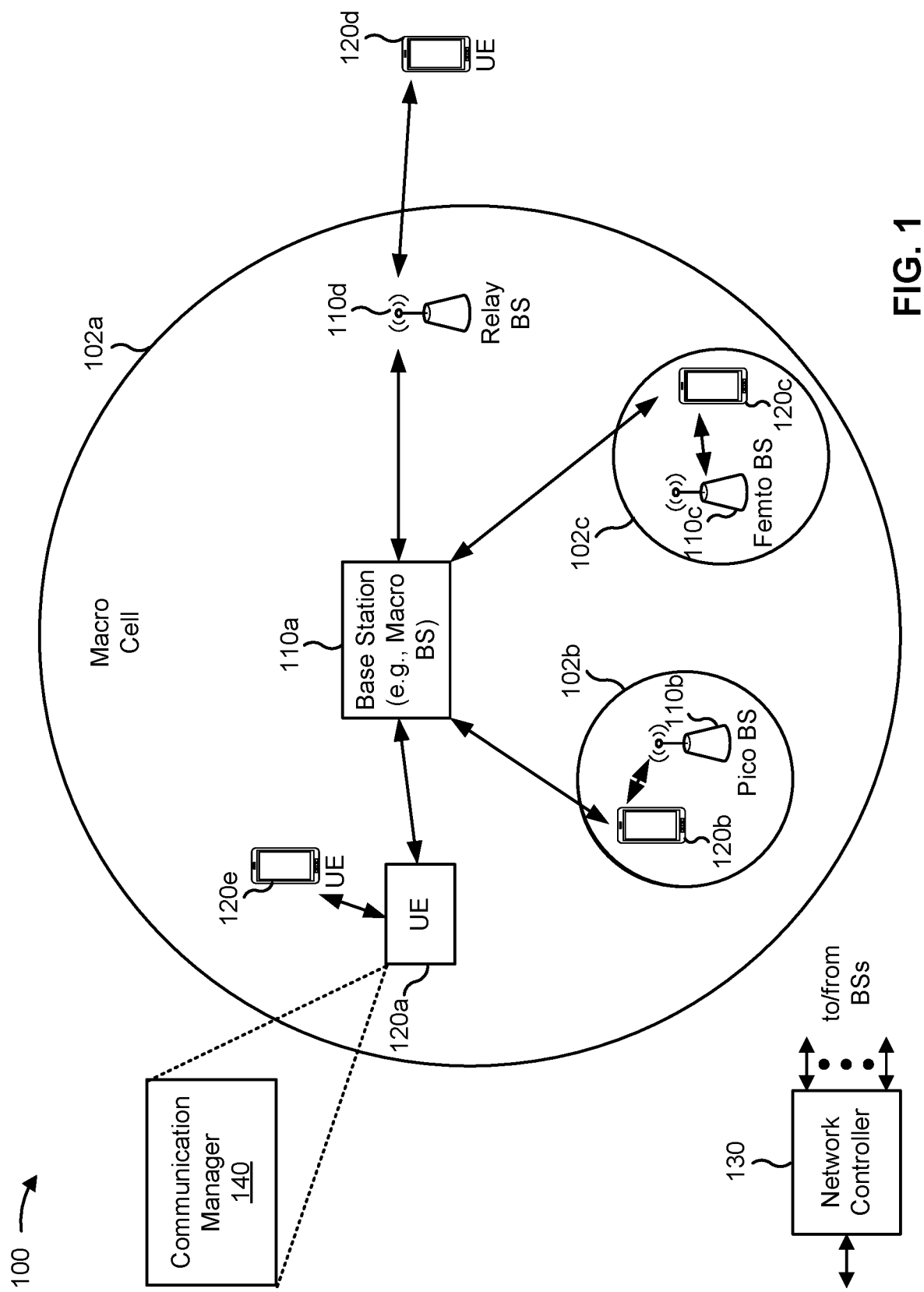
FIG. 1 is diagram illustrating an example of a wireless network.

The detailed description set forth below in connection with the appended drawings is intended as a description of various configurations and is not intended to represent the only configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

As described herein, a node, which may be referred to as a "node," a "network node," or a "wireless node," may be a base station (e.g., the base station 110), a UE (e.g., the UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa.

Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, the term "base station" or "network node" may refer to an aggregated network node, a disaggregated network node, and/or one or more components of a disaggregated network node. For example, in some aspects, "base station" may refer to a control unit (CU), a distributed unit (DU), a plurality of control units, a plurality of distributed units, and/or a combination thereof. In some aspects, "base station" or "network node" may refer to one device configured to perform one or more functions such as those described above in connection with the network node 110. In some aspects, "base station" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" may refer to any one or more of those different devices. In some aspects, "base station" may refer to one or more virtual base stations, one or more virtual base station functions, and/or a combination of thereof. For example, in some cases, two or more base station functions may be instantiated on a single device. In some aspects, "base station" may refer to one of the base station functions and not another. In this way, a single device may include more than one base station.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components (e.g., one or more processors) and/or memory components (e.g., a memory), which may be operatively coupled, communicatively coupled, electronically coupled, and/or electrically coupled. In some examples, a UE may measure channel state information reference signals (CSI-RSs) transmitted from a base station and determine CQI values for sub-bands on which the UE may communicate. Based at least in part on determining the CQI values, the UE may select a subset of CQI values to report, such as one or more worst CQI values from a best CSI-RS or one or more worst CQI values from a worst CSI-RS, among other examples. In this case, the base station may select a demodulation reference signal (DMRS) port or modulation and coding scheme (MCS) for communication with the UE based at least in part on the reported subset of CQI values.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may measure a plurality of sets of CQI measurements for a plurality of measurement resources, wherein each measurement resource, of the plurality of measurement resources, is associated with a set of CQI measurements, of the plurality of sets of CQI measurements, corresponding to a set of sub-bands; select one or more CQI measurements, of the plurality of sets of CQI measurements, based at least in part on a configured set of selection criteria; and report the one or more CQI measurements selected based at least in part on the configured set of selection criteria. Additionally, or alternatively, the communication manager 140 may perform one or more other operations described herein.

As indicated above, FIG. 1 is provided as an example. Other examples may differ from what is described with regard to FIG. 1.

Figure 2:
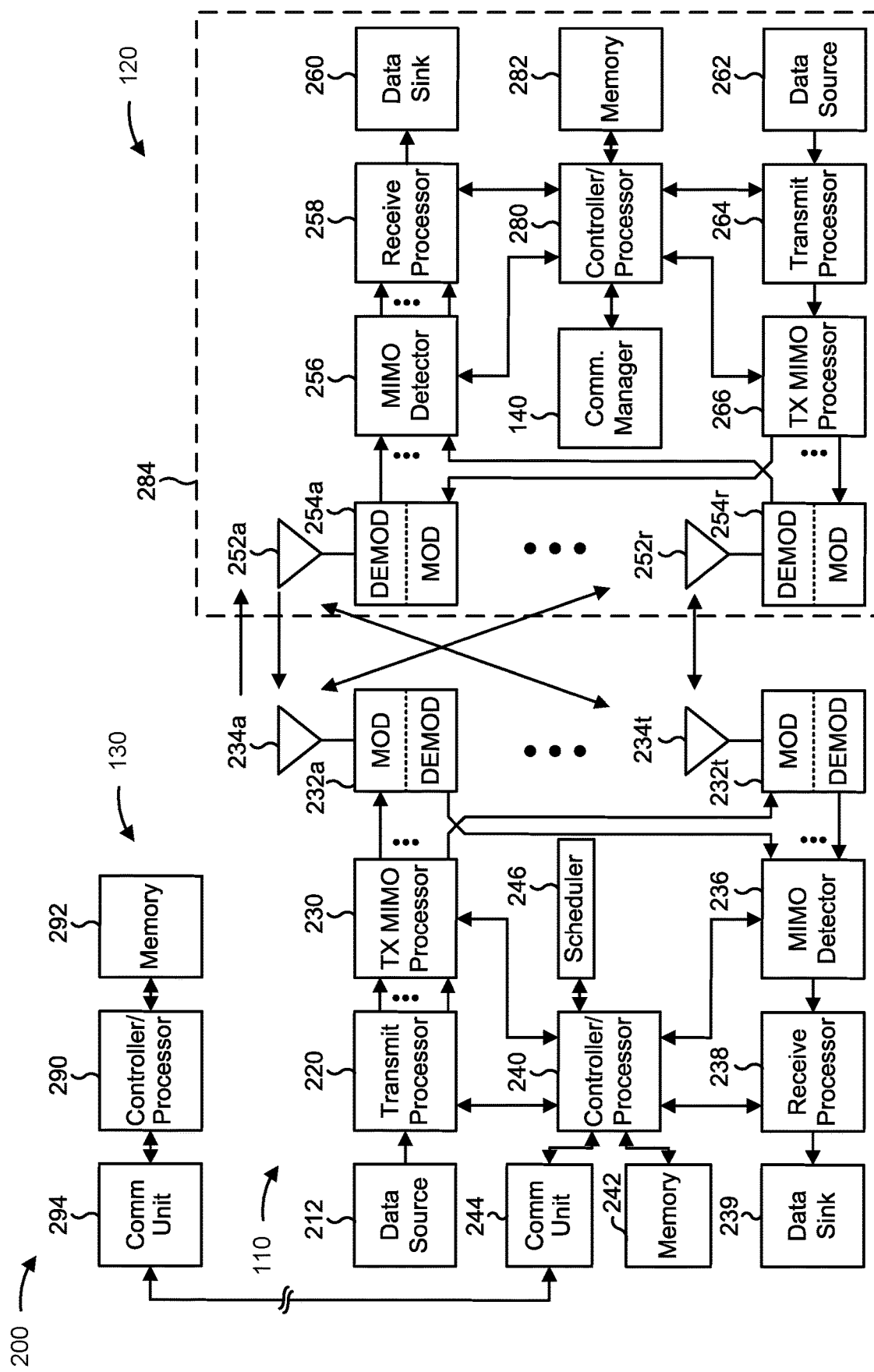
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. In some aspects, the CQIs may be a subset of determined CQIs, such as one or more worst CQIs of a best CSI-RS or of a worst CSI-RS that the UE has measured. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with selective sub-band channel quality indicator (CQI) reporting, as described in more detail elsewhere herein. For example, the controller/processor 240 of the base station 110, the controller/processor 280 of the UE 120, and/or any other component(s) of FIG. 2 may perform or direct operations of, for example, method 500 of FIG. 5 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 500 of FIG. 5 and/or other processes as described herein. In some examples, executing instructions may include running the instructions, converting the instructions, compiling the instructions, and/or interpreting the instructions, among other examples.

In some aspects, a UE includes means for measuring a plurality of sets of CQI measurements for a plurality of measurement resources, wherein each measurement resource, of the plurality of measurement resources, is associated with a set of CQI measurements, of the plurality of sets of CQI measurements, corresponding to a set of sub-bands; means for selecting one or more CQI measurements, of the plurality of sets of CQI measurements, based at least in part on a configured set of selection criteria; or means for reporting the one or more CQI measurements selected based at least in part on the configured set of selection criteria. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
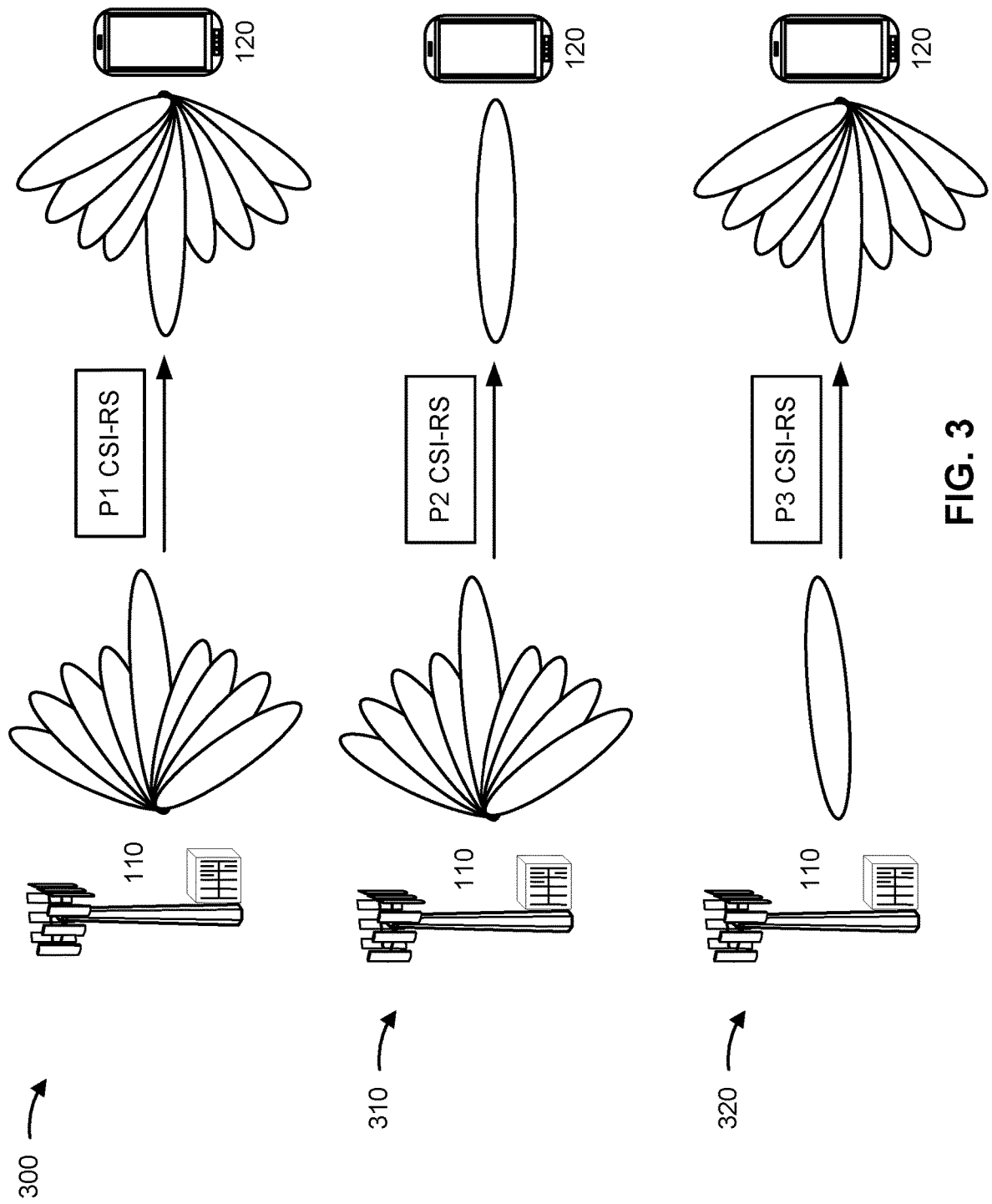
FIG. 3 is a diagram illustrating an example of channel state information (CSI) reference signal (RS) (CSI-RS) beam management procedures.

FIG. 3 is a diagram illustrating examples 300, 310, and 320 of CSI-RS beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, and/or between a scheduled node and a scheduling node). The UE 120 and the base station 110 may be in a connected state (e.g., a radio resource control (RRC) connected state).

As shown in FIG. 3, example 300 may include a base station 110 and a UE 120 communicating to perform beam management using CSI-RSs. Example 300 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 3 and example 300, CSI-RSs may be configured to be transmitted from the base station 110 to the UE 120. The CSI-RSs may be configured to be periodic (e.g., using RRC signaling), semi-persistent (e.g., using media access control (MAC) control element (CE) (MAC-CE) signaling), and/or aperiodic (e.g., using downlink control information (DCI)).

The first beam management procedure may include the base station 110 performing beam sweeping over multiple transmit (Tx) beams. The base station 110 may transmit a CSI-RS using each transmit beam for beam management. To enable the UE 120 to perform receive (Rx or RX) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. For example, the UE 120 may report a subset of determined CQIs based at least in part on a CQI selection procedure, as described in more detail herein. While example 300 has been described in connection with CSI-RSs, the first beam management process may also use synchronization signal blocks (SSBs) for beam management in a similar manner as described above.

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 3 and example 310, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 3, example 320 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 3 and example 320, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, and/or the UE 120 and the base station 110 may perform a similar beam management procedure to select a UE transmit beam.

In some communications systems, reliability requirements may be imposed on communications between a UE and a base station. For example, ultra-reliable low-latency communications (URLLC) may be deployed to support connected devices, IoT devices, autonomous driving deployments, and many other types of use cases. To satisfy the reliability requirements, a base station may request that a UE report only a subset of CQIs when the UE performs a set of CQI measurements of a CSI-RS across a set of sub-bands. In this case, the UE may report only CQIs of the worst M sub-bands among all sub-bands measured by the UE. In other words, the UE may report one or more CQIs with the lowest values among all CQIs that the UE has determined. By reporting the CQIs of the worst M sub-bands, the base station is enabled to select an MCS based at least in part on a worst case with respect to channel quality (e.g., the base station selects the MCS based at least in part on the lowest CQI values that the UE has measured). In this way, the base station ensures that the MCS is selected to guarantee that the reliability requirement for URLLC is satisfied.

In multi-port operation, a base station may transmit a set of CSI-RSs corresponding to a set of ports of the UE and the UE may perform a set of CQI measurements on each port and across each sub-band. For example, the UE may perform a first set of CQI measurements of a first CSI-RS on a first port and for a set of sub-bands and a second set of CQI measurements of a second CSI-RS on a second port and for the set of sub-bands. However, current reporting of CQI measurements is limited to single port operation. Thus, some aspects described herein provide techniques for CQI reporting when using measuring a set of CSI-RSs across a set of sub-bands. For example, a UE may select, for each CSI-RS resource that the UE measures, a set of M worst CQIs and may select a best CSI-RS resource (e.g., based at least in part on a corresponding set of M worst CQIs for the CSI-RS resource). In this case, the UE may report the M worst CQIs for the selected CSI-RS resource. In this way, using a "worst-best" selection procedure, the UE enables the base station to pick a DMRS port on which schedule URLLC traffic and an MCS for the URLLC traffic on the selected DMRS port. In another example, the UE may select, for each CSI-RS resource that the UE measures, a set of M worst CQIs and may select a worst CSI-RS resource. In this way, using a "worst-worst" selection procedure, the UE enables the base station to select an MCS based at least in part on a worst-case scenario of channel conditions across DMRS ports.

FIGS. 4A-4D are diagrams illustrating examples 400/400' associated with selective sub-band channel quality indicator (CQI) reporting, in accordance with the present disclosure. As shown in FIGS. 4A-4D, example 400 includes communication between a base station 110 and a UE 120. In some aspects, the base station 110 and the UE 120 may be included in a wireless network, such as wireless network 100. The base station 110 and UE 120 may communicate via a wireless access link, which may include an uplink and a downlink.

Figure 4A:
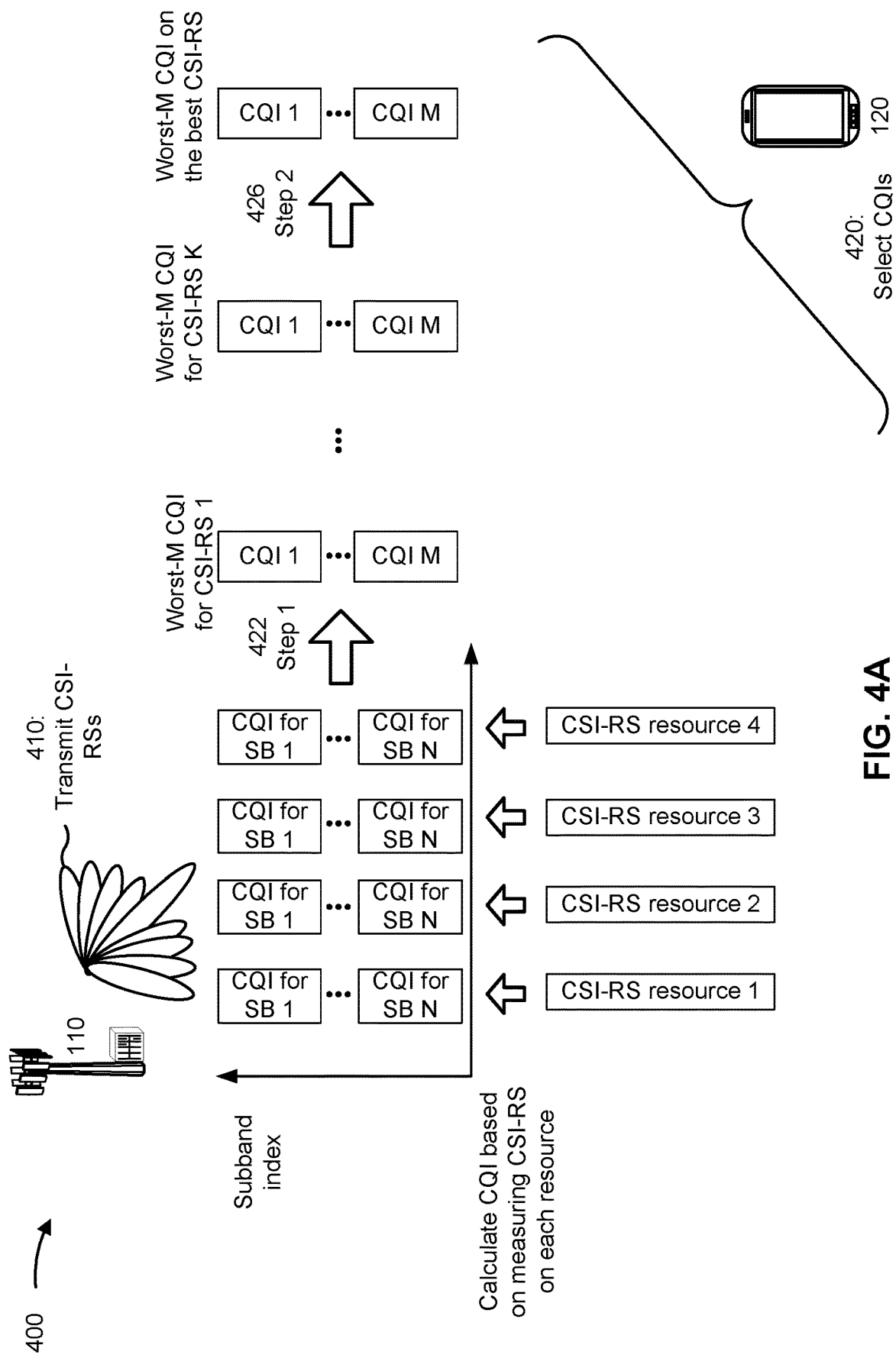
FIGS. 4A-4D are diagrams illustrating examples associated with selective sub-band channel quality indicator (CQI) reporting.
Figure 4B:
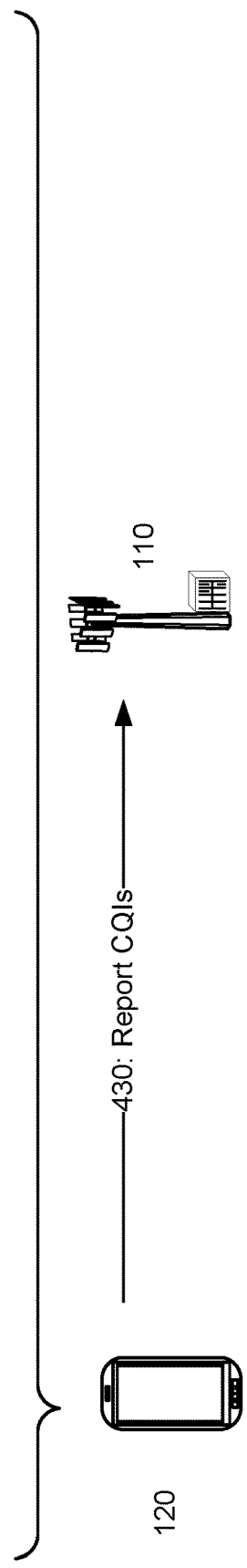
Figure 4C:
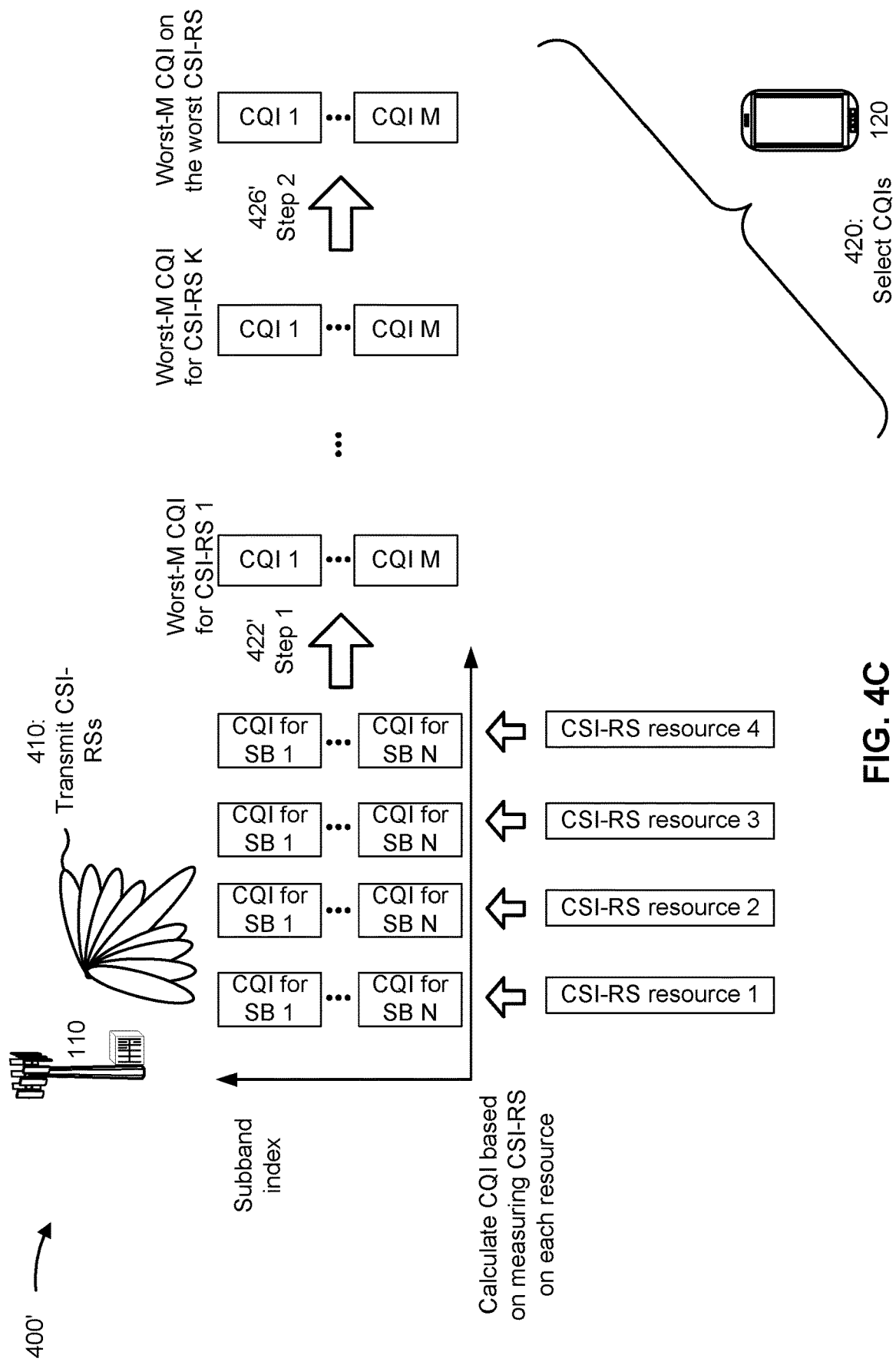

As further shown in FIGS. 4A and 4C, and at 410, base station 110 may transmit a plurality of CSI-RSs. For example, base station 110 may transmit a first CSI-RS using a first CSI-RS resource, a second CSI-RS using a second CSI-RS resource, a third CSI-RS using a third CSI-RS resource, and a fourth CSI-RS using a fourth CSI-RS resource. In some aspects, the set of CSI-RSs and the associated set of CSI-RS resources correspond to DMRS ports of UE 120. For example, base station 110 may configure UE 120 with CSI-RS resources (e.g., CSI-RS resources 1 to K) for measuring a CQI for each sub-band (e.g., sub-bands 1 to N) on which UE 120 is to communicate with each DMRS port of UE 120 (e.g., DMRS ports 1 to K). In some aspects, UE 120 may receive a request to report CQI measurements and, in connection with the request, may receive information configuring the CSI-RS resources and/ or sub-bands on which to perform CQI measurements.

Figure 4D:
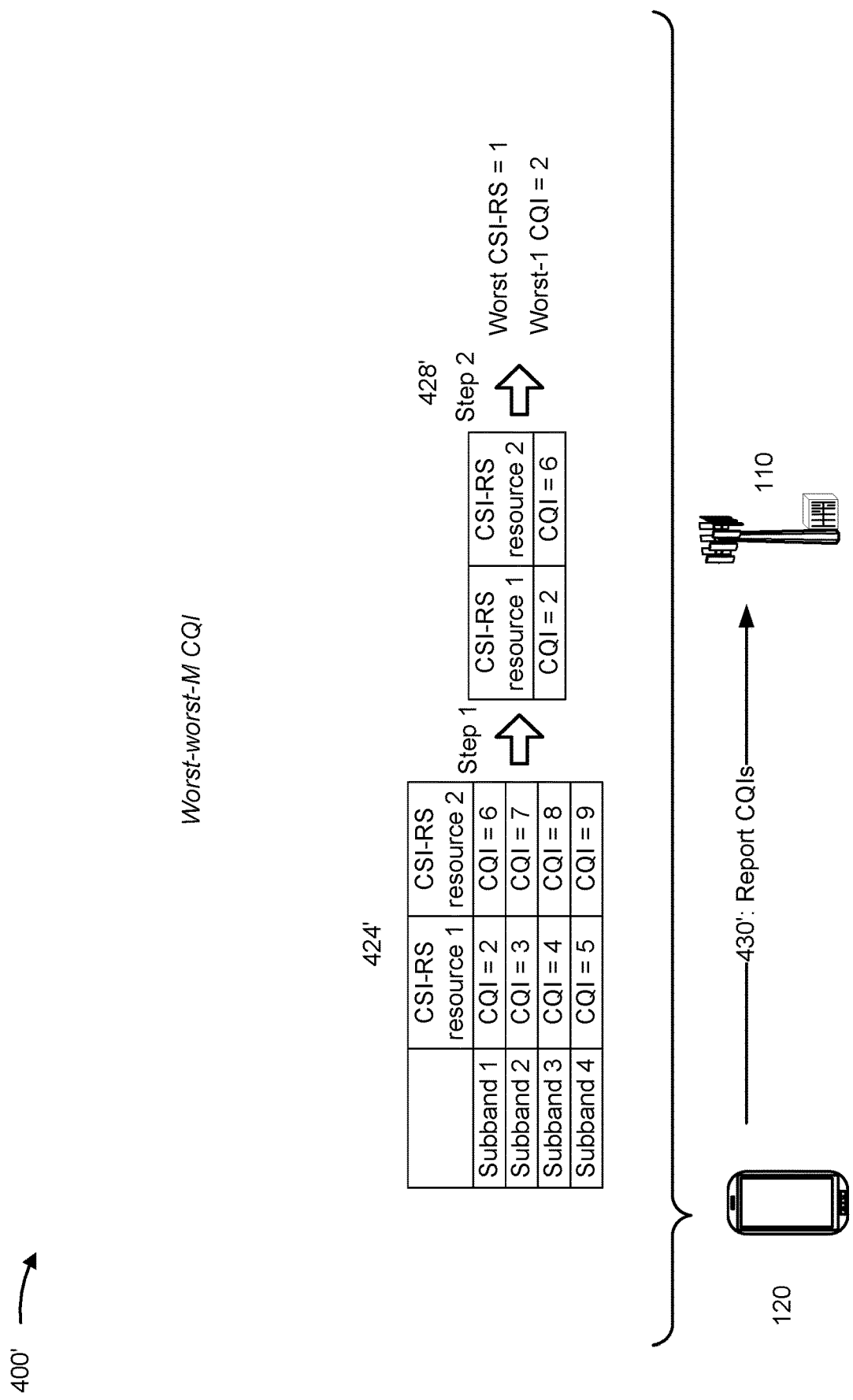

As further shown in FIGS. 4A and 4C, and at 420, UE 120 may select CQIs for reporting. For example, as shown in FIG. 4A, UE 120 may measure a plurality of sets of CQIs where each set of CQIs includes a CQI for each sub-band on which UE 120 is to communicate. In this case, UE 120 may measure a total of K*N CQIs. In a first step of a CQI selection procedure, as shown in FIGS. 4A and 4C, and at 422/422', UE 120 may select a worst M CQIs for each CSI-RS, where M≤N. For example, UE 120 may select a single worst CQI for each CSI-RS, a pair of worst CQIs for each CSI-RS, or another quantity of worst CQIs for each CSI-RS. In some aspects, a worst CQI may include a CQI with a lowest value. For example, as shown in FIGS. 4B and 4D, and at 424/424', UE 120 may select, for CSI-RS resource 1, sub-band 1 as having a worst CQI (e.g., CQI=2), which is lower than CQIs for each other sub-band on CSI-RS resource 1. Similarly, UE 120 may select, for CSI-RS resource 2, sub-band 1 as having a worst CQI (e.g., CQI=6), which is lower than CQIs for each other sub-band on CSI-RS resource 2.

In a second step of a CQI selection procedure, as shown in FIGS. 4A and 4C, and at 426/426', UE 120 may select a CSI-RS based at least in part on the selected worst CQIs for the CSI-RS. For example, as shown in FIG. 4B, and at 428, UE 120 may select a best CSI-RS (e.g., a CSI-RS with a best CQI of the worst CQIs) and report the worst CQI for the best CSI-RS. In this case, UE 120 selects CSI-RS resource 2, which has a higher worst CQI (CQI=6) than CSI-RS resource 1 (CQI=2). When there are a plurality of CQIs selected as worst CQIs, UE 120 may select the best CSI-RS based at least in part on a total of the worst CQIs (e.g., summing CQIs within worst CQIs of each CSI-RS), a highest worst CQI, a lowest worst CQI, an average worst CQI, or another technique. In this way, UE 120 performs a worst-best selection procedure for identifying a CQI (or CQIs) to report.

In contrast, as shown in FIG. 4D, and at 428', UE 120 may select a worst CSI-RS (e.g., a CSI-RS with a worst CQI of the worst CQIs) and report the worst CQI for the worst CSI-RS. In this case, UE 120 selects CSI-RS resource 1, which has a lower worst CQI (CQI=2) than CSI-RS resource 2 (CQI=6). When there are a plurality of CQIs selected as worst CQIs, UE 120 may select the worst CSI-RS based at least in part on a total of the worst CQIs (e.g., summing CQIs within worst CQIs of each CSI-RS), a highest worst CQI, a lowest worst CQI, an average worst CQI, or another technique. In this way, UE 120 performs a worst-worst selection procedure for identifying a CQI (or CQIs) to report.

As further shown in FIGS. 4B and 4D, and at 430/430', UE 120 may report a selected subset of CQIs. For example, UE 120 may report one or more worst CQIs of a worst CSI-RS or one or more worst CQIs of a best CSI-RS. In this case, base station 110 may use the received CQIs to select a DMRS port or an MCS, among other examples, for communication with UE 120 and may indicate the DMRS port or the MCS to UE 120 for use in communication.

As indicated above, FIGS. 4A-4D are provided as one or more example. Other examples may differ from what is described with respect to FIGS. 4A-4D.

Figure 5:
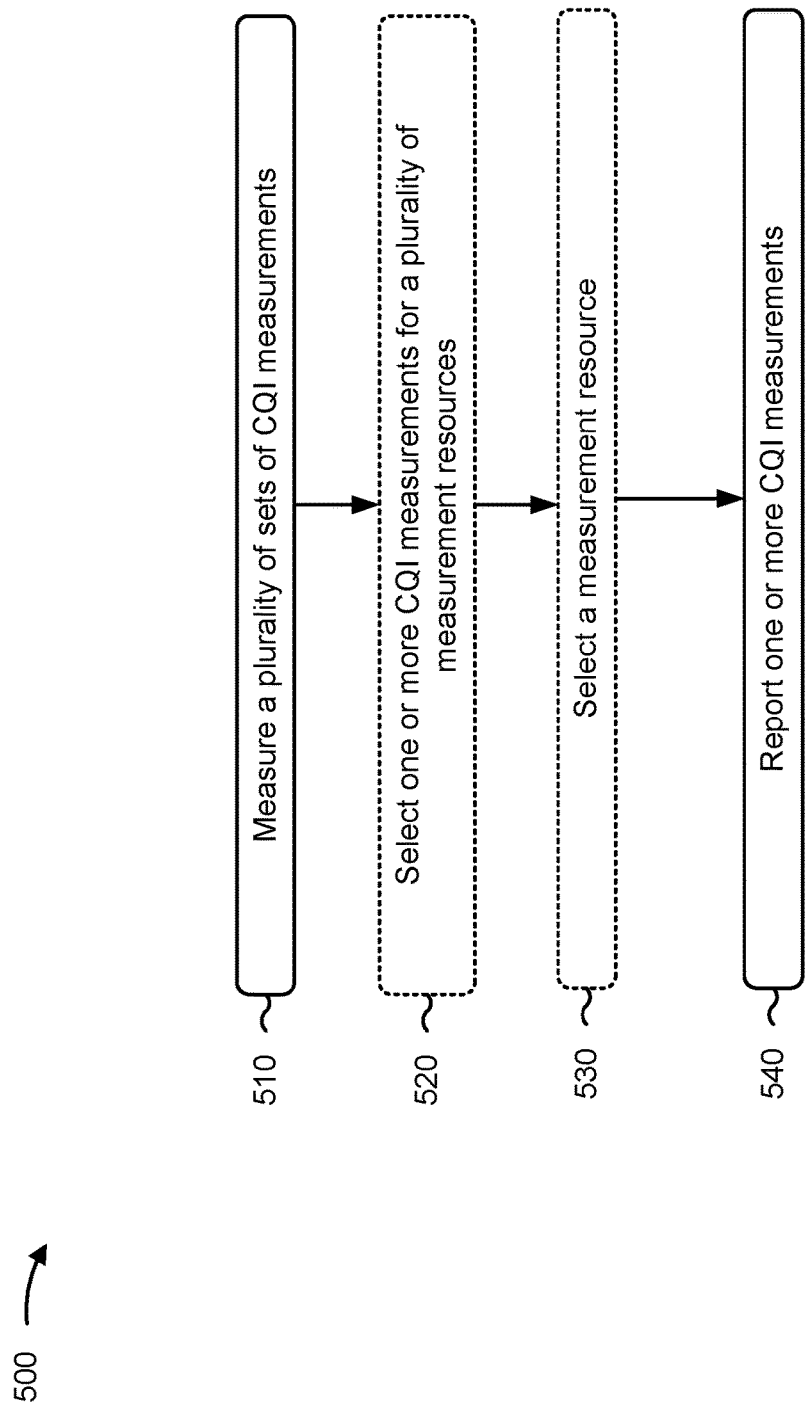
FIG. 5 is a flowchart of an example method of wireless communication.

FIG. 5 is a flowchart of an example method 500 of wireless communication. The method 500 may be performed by, for example, a UE (e.g., UE 120).

At 510, the UE may measure a plurality of sets of CQI measurements for a plurality of measurement resources. For example, the UE (e.g., using measurement component 608, depicted in FIG. 6) may measure a set of CQI measurements for each CSI-RS resource that is configured for the UE, as described above in connection with, for example, FIGS. 4A and 4C, and at 420. In some aspects, each measurement resource, of the plurality of measurement resources, is associated with a set of CQI measurements, of the plurality of sets of CQI measurements, corresponding to a set of sub-bands. In some aspects, the plurality of measurement resources is a plurality of channel state information reference signal resources. In some aspects, method 500 includes receiving a request to report the one or more CQI measurements in accordance with the set of selection criteria, and reporting the one or more CQI measurements comprises reporting the one or more CQI measurements in accordance with the set of selection criteria based at least in part on receiving the request. In some aspects, method 500 includes receiving configuration information identifying at least one of the plurality of measurement resources or the set of sub-bands, and measuring the plurality of sets of CQI measurements comprises measuring the plurality of sets of CQI measurements based at least in part on the configuration information.

At 520, in some aspects, the UE may select one or more CQI measurements for a plurality of measurement resources. For example, the UE (e.g., using selection component 610, depicted in FIG. 6) may select a worst subset of CQI measurements for each CSI-RS resource that is configured for the UE, as described above in connection with, for example, FIGS. 4A and 4C, and at 424/424'. In some aspects, method 500 includes selecting the one or more CQI measurements based at least in part on the configured set of selection criteria, and reporting the one or more CQI measurements comprises reporting the one or more CQI measurements based at least in part on selecting the one or more CQI measurements. In some aspects, selecting the one or more CQI measurements comprises selecting, in a set of CQI measurements of the plurality of sets of CQI measurements, a subset of CQI measurements, and selecting the one or more CQI measurements based at least in part on the subset of CQI measurements.

At 530, in some aspects, the UE may select a measurement resource. For example, the UE (e.g., using selection component 610, depicted in FIG. 6) may select a worst CSI-RS or a best CSI-RS based at least in part on a corresponding one or more worst CQI measurements, as described above in connection with, for example, FIGS. 4B and 4D, and at 428/428'. In some aspects, selecting the one or more CQI measurements comprises selecting a measurement resource of the plurality of measurement resources, and selecting the one or more CQI measurements based at least in part on selecting the measurement resource. In some aspects, selecting the one or more CQI measurements comprises selecting, for each set of CQI measurements of the plurality of sets of CQI measurements, a corresponding subset of CQI measurements, wherein a subset of CQI measurements represents one or more lowest CQI values among the corresponding set of CQI measurements, selecting a particular measurement resource, of the plurality of measurement resources, based at least in part on values of a particular corresponding subset of CQI measurements, and selecting the one or more CQI measurements from the particular corresponding subset of CQI measurements associated with the particular measurement resource.

In some aspects, selecting the particular measurement resource comprises selecting the particular measurement resource for which the particular corresponding subset of CQI measurements is associated with at least one of a largest total value, a largest minimum value, a smallest total value, or a smallest minimum value. In some aspects, selecting the one or more CQI measurements comprises selecting a worst one or more CQI measurements of a best measurement resource from among the plurality of sets of CQI measurements and the plurality of measurement resources. In some aspects, selecting the one or more CQI measurements comprises selecting a worst one or more CQI measurements of a worst measurement resource from among the plurality of sets of CQI measurements and the plurality of measurement resources.

At 540, the UE may report one or more CQI measurements. For example, the UE (e.g., using transmission component 604, depicted in FIG. 6) may report one or more CQI measurements, of the plurality of sets of CQI measurements, selected based at least in part on a configured set of selection criteria, as described above in connection with, for example, FIGS. 4B and 4D and at 430. In some aspects, as a response to reporting the one or more CQI measurements, the UE may receive configuration information configuring a DMRS port or MCS to use for communication.

Although FIG. 5 shows example blocks of method 500, in some aspects, method 500 may include additional blocks, fewer blocks, different blocks, or differently arranged blocks than those depicted in FIG. 5. Additionally, or alternatively, two or more of the blocks of method 500 may be performed in parallel.

Figure 6:
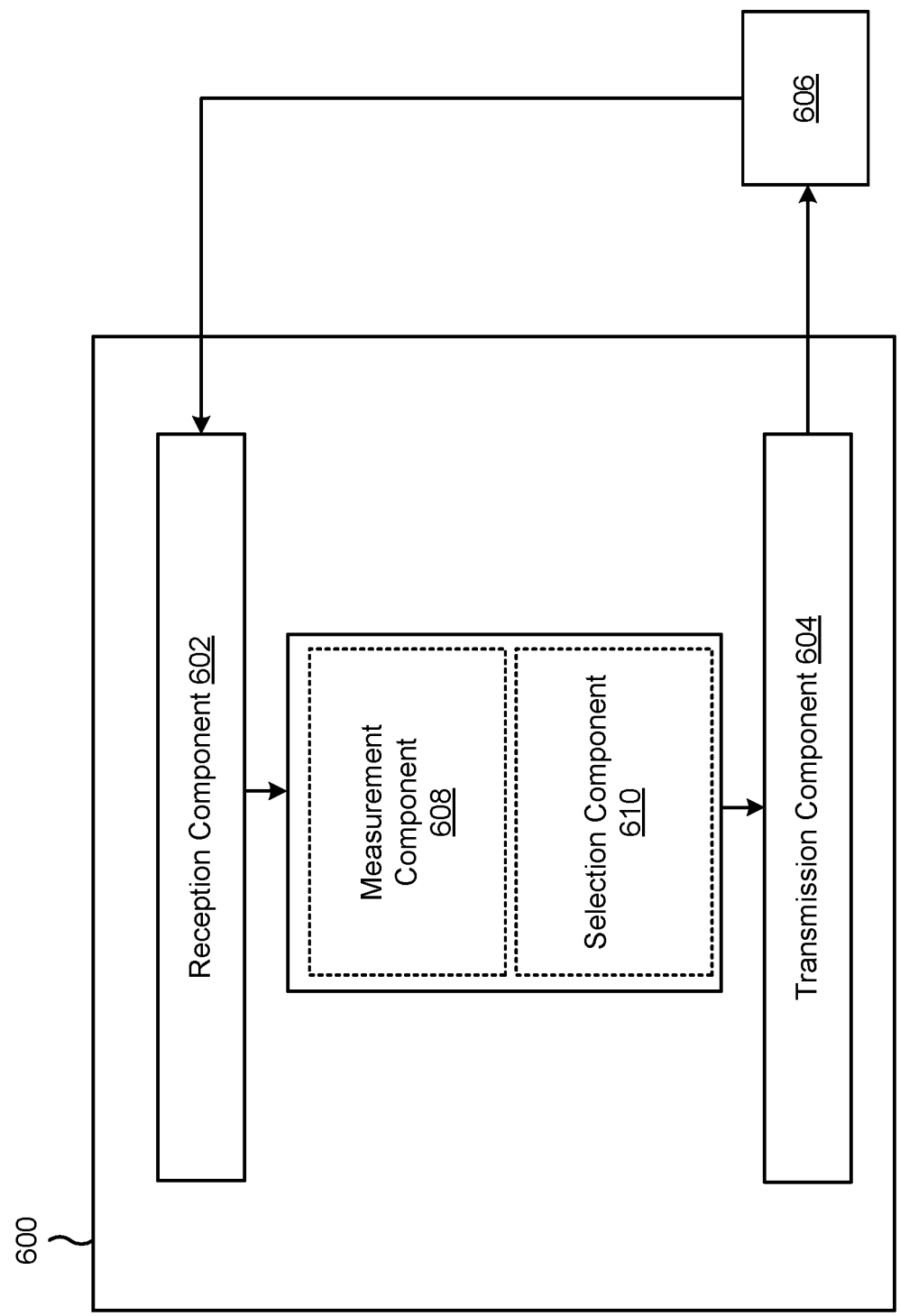
FIG. 6 is a block diagram of an example apparatus for wireless communication.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a measurement component 608 or a selection component 610, among other examples.

In some aspects, the apparatus 600 may be configured to perform one or more operations described herein in connection with FIGS. 4A-4D. Additionally, or alternatively, the apparatus 600 may be configured to perform one or more processes described herein, such as method 500 of FIG. 5. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The measurement component 608 may measure a plurality of sets of CQI measurements for a plurality of measurement resources, wherein each measurement resource, of the plurality of measurement resources, is associated with a set of CQI measurements, of the plurality of sets of CQI measurements, corresponding to a set of sub-bands. The transmission component 604 may report one or more CQI measurements, of the plurality of sets of CQI measurements, selected based at least in part on a configured set of selection criteria. The selection component 610 may select the one or more CQI measurements based at least in part on the configured set of selection criteria. The reception component 602 may receive a request to report the one or more CQI measurements in accordance with the set of selection criteria. The reception component 602 may receive configuration information identifying at least one of the plurality of measurement resources or the set of sub-bands.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
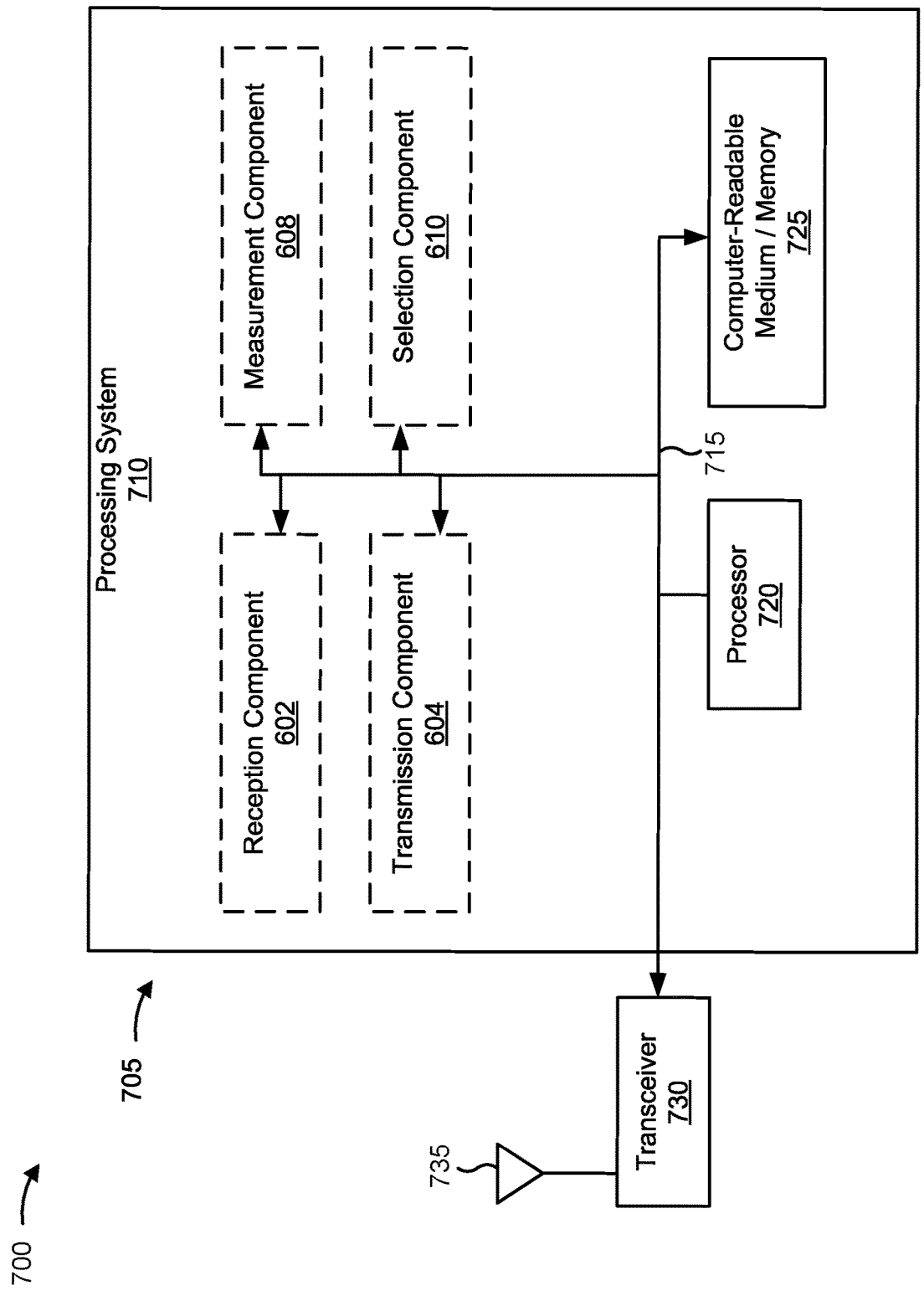
FIG. 7 is a diagram illustrating an example of a hardware implementation for an apparatus employing a processing system.

FIG. 7 is a diagram illustrating an example 700 of a hardware implementation for an apparatus 705 employing a processing system 710. The apparatus 705 may be a UE.

The processing system 710 may be implemented with a bus architecture, represented generally by the bus 715. The bus 715 may include any number of interconnecting buses and bridges depending on the specific application of the processing system 710 and the overall design constraints. The bus 715 links together various circuits including one or more processors and/or hardware components, represented by the processor 720, the illustrated components, and the computer-readable medium/memory 725. The bus 715 may also link various other circuits, such as timing sources, peripherals, voltage regulators, and/or power management circuits.

The processing system 710 may be coupled to a transceiver 730. The transceiver 730 is coupled to one or more antennas 735. The transceiver 730 provides a means for communicating with various other apparatuses over a transmission medium. The transceiver 730 receives a signal from the one or more antennas 735, extracts information from the received signal, and provides the extracted information to the processing system 710, specifically the reception component 602. In addition, the transceiver 730 receives information from the processing system 710, specifically the transmission component 604, and generates a signal to be applied to the one or more antennas 735 based at least in part on the received information.

The processing system 710 includes a processor 720 coupled to a computer-readable medium/memory 725. The processor 720 is responsible for general processing, including the execution of software stored on the computer-readable medium/memory 725. The software, when executed by the processor 720, causes the processing system 710 to perform the various functions described herein for any particular apparatus. The computer-readable medium/memory 725 may also be used for storing data that is manipulated by the processor 720 when executing software. The processing system further includes at least one of the illustrated components. The components may be software modules running in the processor 720, resident/stored in the computer-readable medium/memory 725, one or more hardware modules coupled to the processor 720, or some combination thereof.

In some aspects, the processing system 710 may be a component of the UE 120 and may include the memory 282 and/or at least one of the TX MIMO processor 266, the RX processor 258, and/or the controller/processor 280. In some aspects, the apparatus 705 for wireless communication includes means for measuring a plurality of sets of CQI measurements for a plurality of measurement resources; select one or more CQI measurements, of the plurality of sets of CQI measurements, based at least in part on a configured set of selection criteria; or report the one or more CQI measurements selected based at least in part on the configured set of selection criteria, among other examples. The aforementioned means may be one or more of the aforementioned components of the apparatus 600 and/or the processing system 710 of the apparatus 705 configured to perform the functions recited by the aforementioned means. As described elsewhere herein, the processing system 710 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 7 is provided as an example. Other examples may differ from what is described in connection with FIG. 7.

Figure 8:
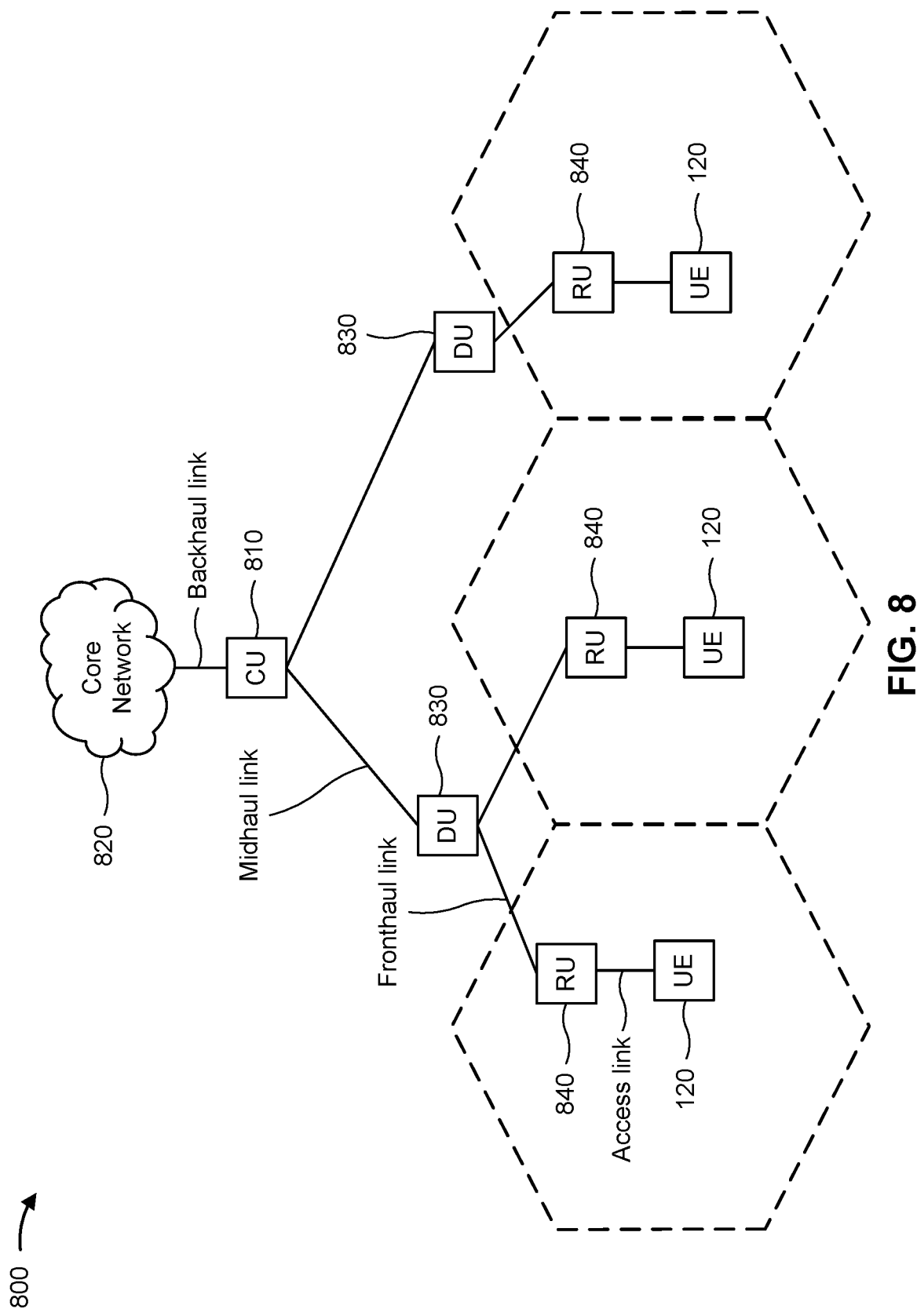
FIG. 8 is a diagram illustrating an example of an open RAN (O-RAN) architecture.

FIG. 8 is a diagram illustrating an example 800 of an open RAN (O-RAN) architecture, in accordance with the present disclosure. As shown in FIG. 8, the O-RAN architecture may include a control unit (CU) 810 that communicates with a core network 820 via a backhaul link. Furthermore, the CU 810 may communicate with one or more DUs 830 via respective midhaul links. The DUs 830 may each communicate with one or more RUs 840 via respective fronthaul links, and the RUs 840 may each communicate with respective UEs 120 via radio frequency (RF) access links. The DUs 830 and the RUs 840 may also be referred to as O-RAN DUs (O-DUs) 830 and O-RAN RUs (O-RUs) 840, respectively.

In some aspects, the DUs 830 and the RUs 840 may be implemented according to a functional split architecture in which functionality of a base station 110 (e.g., an eNB or a gNB) is provided by a DU 830 and one or more RUs 840 that communicate over a fronthaul link. Accordingly, as described herein, a base station 110 may include a DU 830 and one or more RUs 840 that may be co-located or geographically distributed. In some aspects, the DU 830 and the associated RU(s) 840 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 830 may correspond to a logical unit that includes one or more base station functions to control the operation of one or more RUs 840. For example, in some aspects, the DU 830 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 810. The RU(s) 840 controlled by a DU 830 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 840 handle all over the air (OTA) communication with a UE 120, and real-time and non-real-time aspects of control and user plane communication with the RU(s) 840 are controlled by the corresponding DU 830, which enables the DU(s) 830 and the CU 810 to be implemented in a cloud-based RAN architecture.

As indicated above, FIG. 8 is provided as an example. Other examples may differ from what is described with regard to FIG. 8.

The following provides an overview of some Aspects of the present disclosure:

Aspect 1: A method of wireless communication performed by a user equipment (UE), comprising: measuring a plurality of sets of channel quality indicator (CQI) measurements for a plurality of measurement resources, wherein each measurement resource, of the plurality of measurement resources, is associated with a set of CQI measurements, of the plurality of sets of CQI measurements, corresponding to a set of sub-bands; select one or more CQI measurements, of the plurality of sets of CQI measurements, based at least in part on a configured set of selection criteria; and report the one or more CQI measurements selected based at least in part on the configured set of selection criteria.

Aspect 2: The method of Aspect 1, further comprising: selecting the one or more CQI measurements based at least in part on the configured set of selection criteria; and wherein reporting the one or more CQI measurements comprises: reporting the one or more CQI measurements based at least in part on selecting the one or more CQI measurements.

Aspect 3: The method of any of Aspects 1 to 2, wherein selecting the one or more CQI measurements comprises: selecting, in a set of CQI measurements of the plurality of sets of CQI measurements, a subset of CQI measurements; and selecting the one or more CQI measurements based at least in part on the subset of CQI measurements.

Aspect 4: The method of any of Aspects 1 to 3, wherein selecting the one or more CQI measurements comprises: selecting a measurement resource of the plurality of measurement resources; and selecting the one or more CQI measurements based at least in part on selecting the measurement resource.

Aspect 5: The method of any of Aspects 1 to 4, wherein selecting the one or more CQI measurements comprises: selecting, for each set of CQI measurements of the plurality of sets of CQI measurements, a corresponding subset of CQI measurements, wherein the corresponding subset of CQI measurements represents one or more lowest CQI values among a set of CQI measurements of the plurality of sets of CQI measurements; and selecting a particular measurement resource, of the plurality of measurement resources, based at least in part on values of a particular corresponding subset of CQI measurements; and selecting the one or more CQI measurements from the particular corresponding subset of CQI measurements associated with the particular measurement resource.

Aspect 6: The method of any of Aspects 1 to 5, wherein selecting the particular measurement resource comprises: selecting the particular measurement resource for which the particular corresponding subset of CQI measurements is associated with at least one of: a largest total value, a largest minimum value, a smallest total value, or a smallest minimum value.

Aspect 7: The method of any of Aspects 1 to 6, wherein selecting the one or more CQI measurements comprises: selecting a worst one or more CQI measurements of a best measurement resource from among the plurality of sets of CQI measurements and the plurality of measurement resources.

Aspect 8: The method of any of Aspects 1 to 7, wherein selecting the one or more CQI measurements comprises: selecting a worst one or more CQI measurements of a worst measurement resource from among the plurality of sets of CQI measurements and the plurality of measurement resources.

Aspect 9: The method of any of Aspects 1 to 8, wherein the plurality of measurement resources is a plurality of channel state information reference signal resources.

Aspect 10: The method of any of Aspects 1 to 9, further comprising: receiving a request to report the one or more CQI measurements in accordance with the set of selection criteria; and wherein reporting the one or more CQI measurements comprises: reporting the one or more CQI measurements in accordance with the set of selection criteria based at least in part on receiving the request.

Aspect 11: The method of any of Aspects 1 to 10, further comprising: receiving configuration information identifying at least one of the plurality of measurement resources or the set of sub-bands; and wherein measuring the plurality of sets of CQI measurements comprises: measuring the plurality of sets of CQI measurements based at least in part on the configuration information.

Aspect 12: An apparatus for wireless communication at a device, comprising a processor; memory coupled with the processor; and instructions stored in the memory and executable by the processor to cause the apparatus to perform the method of one or more Aspects of Aspects 1-11.

Aspect 13: A device for wireless communication, comprising a memory and one or more processors coupled to the memory, the memory and the one or more processors configured to perform the method of one or more Aspects of Aspects 1-11.

Aspect 14: An apparatus for wireless communication, comprising at least one means for performing the method of one or more Aspects of Aspects 1-11.

Aspect 15: A non-transitory computer-readable medium storing code for wireless communication, the code comprising instructions executable by a processor to perform the method of one or more Aspects of Aspects 1-11.

Aspect 16: A non-transitory computer-readable medium storing a set of instructions for wireless communication, the set of instructions comprising one or more instructions that, when executed by one or more processors of a device, cause the device to perform the method of one or more Aspects of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      measure a plurality of sets of channel quality indicator (CQI) measurements for a plurality of measurement resources, wherein each measurement resource, of the plurality of measurement resources, is associated with a set of CQI measurements, of the plurality of sets of CQI measurements, corresponding to a set of sub-bands; and
      report one or more CQI measurements, of the plurality of sets of CQI measurements, selected based at least in part on a configured set of selection criteria, wherein the plurality of measurement resources correspond to a plurality of demodulation reference signal (DMRS) ports of the UE.

2. The UE of claim 1, wherein the one or more processors are further configured to:
   select the one or more CQI measurements based at least in part on the configured set of selection criteria; and
   wherein the one or more processors, to report the one or more CQI measurements, are configured to:
      report the one or more CQI measurements based at least in part on selecting the one or more CQI measurements.

3. The UE of claim 2, wherein the one or more processors, to select the one or more CQI measurements, are configured to:
   select, in a respective set of CQI measurements of the plurality of sets of CQI measurements, a subset of CQI measurements; and
   select the one or more CQI measurements based at least in part on the subset of CQI measurements.

4. The UE of claim 2, wherein the one or more processors, to select the one or more CQI measurements, are configured to:
   select a measurement resource of the plurality of measurement resources; and
   select the one or more CQI measurements based at least in part on selecting the measurement resource.

5. The UE of claim 2, wherein the one or more processors, to select the one or more CQI measurements, are configured to:
   select, for a respective set of CQI measurements of the plurality of sets of CQI measurements, a corresponding subset of CQI measurements, wherein a subset of CQI measurements represents one or more lowest CQI values among the respective set of CQI measurements; and
   select a particular measurement resource, of the plurality of measurement resources, based at least in part on values of a particular corresponding subset of CQI measurements; and
   select the one or more CQI measurements from the particular corresponding subset of CQI measurements associated with the particular measurement resource.

6. The UE of claim 5, wherein the one or more processors, to select the particular measurement resource, are configured to:
   select the particular measurement resource for which the particular corresponding subset of CQI measurements is associated with at least one of:
      a largest total value,
      a largest minimum value,
      a smallest total value, or
      a smallest minimum value.

7. The UE of claim 2, wherein the one or more processors, to select the one or more CQI measurements, are configured to:
   select a worst one or more CQI measurements of a best measurement resource from among the plurality of sets of CQI measurements and the plurality of measurement resources.

8. The UE of claim 2, wherein the one or more processors, to select the one or more CQI measurements, are configured to:
   select a worst one or more CQI measurements of a worst measurement resource from among the plurality of sets of CQI measurements and the plurality of measurement resources.

9. The UE of claim 1, wherein the plurality of measurement resources is a plurality of channel state information reference signal resources.

10. The UE of claim 1, wherein the one or more processors are further configured to:
receive a request to report the one or more CQI measurements in accordance with the configured set of selection criteria; and
wherein the one or more processors, to report the one or more CQI measurements, are configured to:
report the one or more CQI measurements in accordance with the configured set of selection criteria based at least in part on receiving the request.

11. The UE of claim 1, wherein the one or more processors are further configured to:
receive configuration information identifying at least one of the plurality of measurement resources or the set of sub-bands; and
wherein the one or more processors, to measure the plurality of sets of CQI measurements, are configured to:
measure the plurality of sets of CQI measurements based at least in part on the configuration information.

12. A method of wireless communication performed by a user equipment (UE), comprising:
measuring a plurality of sets of channel quality indicator (CQI) measurements for a plurality of measurement resources, wherein each measurement resource, of the plurality of measurement resources, is associated with a set of CQI measurements, of the plurality of sets of CQI measurements, corresponding to a set of sub-bands; and
reporting one or more CQI measurements, of the plurality of sets of CQI measurements, selected based at least in part on a configured set of selection criteria, wherein the plurality of measurement resources correspond to a plurality of demodulation reference signal (DMRS) ports of the UE.

13. The method of claim 12, further comprising:
selecting the one or more CQI measurements based at least in part on the configured set of selection criteria; and
wherein reporting the one or more CQI measurements comprises:
reporting the one or more CQI measurements based at least in part on selecting the one or more CQI measurements.

14. The method of claim 13, wherein selecting the one or more CQI measurements comprises:
selecting, in a respective set of CQI measurements of the plurality of sets of CQI measurements, a subset of CQI measurements; and
selecting the one or more CQI measurements based at least in part on the subset of CQI measurements.

15. The method of claim 13, wherein selecting the one or more CQI measurements comprises:
selecting a measurement resource of the plurality of measurement resources; and
selecting the one or more CQI measurements based at least in part on selecting the measurement resource.

16. The method of claim 13, wherein selecting the one or more CQI measurements comprises:
selecting, for a respective set of CQI measurements of the plurality of sets of CQI measurements, a corresponding subset of CQI measurements, wherein a subset of CQI measurements represents one or more lowest CQI values among the respective set of CQI measurements; and
selecting a particular measurement resource, of the plurality of measurement resources, based at least in part on values of a particular corresponding subset of CQI measurements; and
selecting the one or more CQI measurements from the particular corresponding subset of CQI measurements associated with the particular measurement resource.

17. The method of claim 16, wherein selecting the particular measurement resource comprises:
selecting the particular measurement resource for which the particular corresponding subset of CQI measurements is associated with at least one of:
a largest total value,
a largest minimum value,
a smallest total value, or
a smallest minimum value.

18. The method of claim 13, wherein selecting the one or more CQI measurements comprises:
selecting a worst one or more CQI measurements of a best measurement resource from among the plurality of sets of CQI measurements and the plurality of measurement resources.

19. The method of claim 13, wherein selecting the one or more CQI measurements comprises:
selecting a worst one or more CQI measurements of a worst measurement resource from among the plurality of sets of CQI measurements and the plurality of measurement resources.

20. The method of claim 12, wherein the plurality of measurement resources is a plurality of channel state information reference signal resources.

21. The method of claim 12, further comprising:
receiving a request to report the one or more CQI measurements in accordance with the configured set of selection criteria; and
wherein reporting the one or more CQI measurements comprises:
reporting the one or more CQI measurements in accordance with the configured set of selection criteria based at least in part on receiving the request.

22. The method of claim 12, further comprising:
receiving configuration information identifying at least one of the plurality of measurement resources or the set of sub-bands; and
wherein measuring the plurality of sets of CQI measurements comprises:
measuring the plurality of sets of CQI measurements based at least in part on the configuration information.

23. A non-transitory computer-readable medium storing a set of instructions for wireless communication, the set of instructions comprising:
one or more instructions that, when executed by one or more processors of a user equipment (UE), cause the UE to:
measure a plurality of sets of channel quality indicator (CQI) measurements for a plurality of measurement resources, wherein each measurement resource, of the plurality of measurement resources, is associated with a set of CQI measurements, of the plurality of sets of CQI measurements, corresponding to a set of sub-bands; and
report one or more CQI measurements, of the plurality of sets of CQI measurements, selected based at least in part on a configured set of selection criteria, wherein the plurality of measurement resources correspond to a plurality of demodulation reference signal (DMRS) ports of the UE.

24. The non-transitory computer-readable medium of claim 23, wherein the one or more instructions further cause the UE to:
select the one or more CQI measurements based at least in part on the configured set of selection criteria; and
wherein the one or more instructions, that cause the UE to report the one or more CQI measurements, cause the UE to:
report the one or more CQI measurements based at least in part on selecting the one or more CQI measurements.

25. The non-transitory computer-readable medium of claim 24, wherein the one or more instructions, that cause the UE to select the one or more CQI measurements, cause the UE to:
select, in a respective set of CQI measurements of the plurality of sets of CQI measurements, a subset of CQI measurements; and
select the one or more CQI measurements based at least in part on the subset of CQI measurements.

26. The non-transitory computer-readable medium of claim 24, wherein the one or more instructions, that cause the UE to select the one or more CQI measurements, cause the UE to:
select a measurement resource of the plurality of measurement resources; and
select the one or more CQI measurements based at least in part on selecting the measurement resource.

27. The non-transitory computer-readable medium of claim 24, wherein the one or more instructions, that cause the UE to select the one or more CQI measurements, cause the UE to:
select, for a respective set of CQI measurements of the plurality of sets of CQI measurements, a corresponding subset of CQI measurements, wherein a subset of CQI measurements represents one or more lowest CQI values among the respective set of CQI measurements; and
select a particular measurement resource, of the plurality of measurement resources, based at least in part on values of a particular corresponding subset of CQI measurements; and
select the one or more CQI measurements from the particular corresponding subset of CQI measurements associated with the particular measurement resource.

28. The non-transitory computer-readable medium of claim 27, wherein the one or more instructions, that cause the UE to select the particular measurement resource, cause the UE to:
select the particular measurement resource for which the particular corresponding subset of CQI measurements is associated with at least one of:
a largest total value,
a largest minimum value,
a smallest total value, or
a smallest minimum value.

29. The non-transitory computer-readable medium of claim 24, wherein the one or more instructions, that cause the UE to select the one or more CQI measurements, cause the UE to:
select a worst one or more CQI measurements of a best measurement resource from among the plurality of sets of CQI measurements and the plurality of measurement resources.

30. An apparatus for wireless communication, comprising:
means for measuring a plurality of sets of channel quality indicator (CQI) measurements for a plurality of measurement resources, wherein each measurement resource, of the plurality of measurement resources, is associated with a set of CQI measurements, of the plurality of sets of CQI measurements, corresponding to a set of sub-bands; and
means for reporting one or more CQI measurements, of the plurality of sets of CQI measurements, selected based at least in part on a configured set of selection criteria, wherein the plurality of measurement resources correspond to a plurality of demodulation reference signal (DMRS) ports of the apparatus.

* * * * *